No. 851,121. PATENTED APR. 23, 1907.
A. P. CRISWELL & A. C. BISHOP.
MEANS FOR MAINTAINING THE STRENGTH OF REFRIGERATING LIQUIDS.
APPLICATION FILED JAN. 26, 1905.
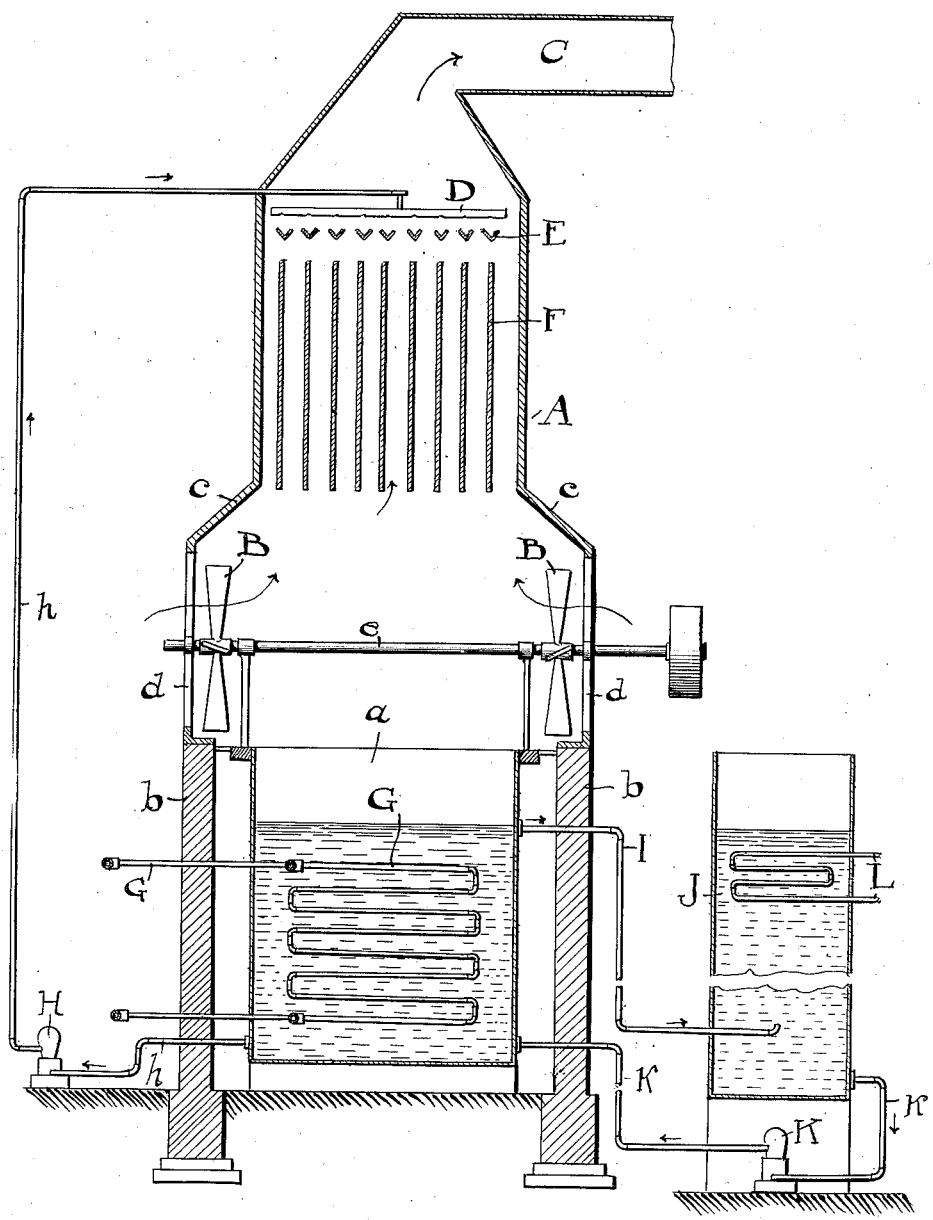
WITNESSES:
INVENTORS
Alexander P. Criswell
Albert C. Bishop
BY
H. T. Fisher
ATTORNEY.

UNITED STATES PATENT OFFICE.

ALEXANDER P. CRISWELL, OF AURORA, INDIANA, AND ALBERT C. BISHOP, OF CLEVELAND, OHIO.

MEANS FOR MAINTAINING THE STRENGTH OF REFRIGERATING LIQUIDS.

No. 851,121.　　　　　Specification of Letters Patent.　　　　Patented April 23, 1907.

Application filed January 26, 1905. Serial No. 242,738.

*To all whom it may concern:*

Be it known that we, ALEXANDER P. CRISWELL, a citizen of the United States, residing at Aurora, in the county of Dearborn and State of Indiana, and ALBERT C. BISHOP, a citizen of the United States, residing at Cleveland, in the county of Cuyahoga and State of Ohio, have invented certain new and useful Improvements in Means for Maintaining the Strength of Refrigerating or Cooling Mediums; and we do declare that the following is a full, clear, and exact description of the invention, which will enable others skilled in the art to which it appertains to make and use the same.

Our invention relates to improvements in means for maintaining the strength of refrigerating or cooling mediums, such as brine used in refrigerating or air cooling apparatuses, and the improvement consists in the construction and combination of parts substantially as hereinafter described and more particularly pointed out in the claims.

Our improvement is embodied in the construction which is shown in this instance as attached to an air cooling system and apparatus, and wherein brine or chloride of calcium solution combined with ammonia coils is used to maintain a low temperature within an insulated room or cooling tower to cool and dry air which is carried off to distant points for refrigerating or other purposes. In this process the moisture in the air which is cooled is eliminated from the air and is added to the brine or chloride of calcium solution, thereby weakening the strength of said solution. As the solution becomes weakened it is customary to add more material to bring it up to the required strength so that the same results can be obtained.

Our object is to provide means for evaporating the surplus moisture as it is added to the solution without raising the temperature of the solution within the cooling tank at any time, and to maintain the same strength of the brine at all times.

In the accompanying drawings a single view is shown which illustrates a cooling tower A of any suitable kind, but which in this instance is built with a brine tank $a$ at its bottom enclosed within walls $b$ on which the cooling tower proper $c$ is supported. Said tower has inlet openings $d$ with fans B mounted on a shaft $e$ and adapted to take in the air from the outside, shown by arrows, and to force the air upward and out through discharge pipe C. At the top of the tower and in the line of the passage of the air is a spraying and brine distributing device comprising perforated pipes D with overflow channels E arranged beneath the same, as well as vertical partition walls F to catch the brine and cause it to flow in a thin film to more thoroughly expose it to the air, or rather to expose the air to a greater amount of cooling medium, because the purpose of this distributing arrangement is to cool the air thoroughly and condense all the moisture out of the air.

A brine tank $a$ is provided with the usual ammonia coils G to keep the brine at a low temperature, and these coils may be connected up in any suitable manner and are of any well known construction.

A pump H having pipe connections $h$ with the bottom of tank $a$ and with distributing device D provide the means for circulating the brine within the cooling tower. During this process of cooling the air the moisture added to the brine from the air decreases the strength of the brine and increases the quantity of the liquid within tank $a$. The surplus brine overflows through pipe I into a second tank J and the same level of the liquid is maintained in both tanks by the following construction and arrangement of parts. A small pump K having pipe connections $k$ with the bottom of the tank J and with the bottom of brine tank $a$ serves to convey the brine solution in tank J back to tank $a$. Tank J is of any suitable construction, and at the extreme top thereof is placed a heating coil L to heat the brine at the top of said tank to a degree of temperature sufficient to cause an evaporation of the solution substantially equal to the surplus water added to the brine within the cooling tower, and which has been taken from the air during the cooling process.

It is a well known and established fact that the lower strata of any body of water is colder than the upper strata, and especially if the upper surface is exposed and open. This fact permits us to employ a heating coil L at the top of tank J to raise the water to a temperature sufficient for rapid evaporation, whereas the brine within the lower portion of the tank remains at the same temperature as it is taken from brine tank a. Thus, the brine within tank a is maintained at the same level and at the same temperature and the same strength at all times, all of which is brought about by the arrangement and combination of parts, and especially tank J having heating coil L at its top.

What we claim is:

1. In an apparatus for maintaining brine or an equivalent solution at an even strength and temperature a brine tank, combined with heating coils located within the upper portion of said tank and said tank having inlet and outlet connections at its bottom distantly located from said heating coils relatively as shown with the body of the solution between said coils and said tank connections, whereby a continuous flow of cold solution is provided within the bottom of said tank and a high evaporating temperature of the solution is maintained in the top of the tank.

2. In an apparatus for maintaining brine or an equivalent solution at an even strength and temperature, a cooling tower and a solution tank therein, in combination with a secondary tank adapted to hold a deep body of solution and having supply and return pipe connections at its bottom with said first tank and provided with evaporating means in its top portion remotely located from said pipe connections and relatively as shown with the greatest body of the solution between the said evaporating means and said supply and return pipe connections, whereby the excess solution is heated and evaporated at the top of said secondary tank during a continuous flow of cold solution in the bottom of the same tank, and means to circulate the cold solution through said tanks.

In testimony whereof we sign this specification in the presence of two witnesses.

ALEXANDER P. CRISWELL.
ALBERT C. BISHOP.

Witnesses for Criswell:
GEORGE J. HELFRICH,
RUDOLPH MEYER.

Witnesses for Bishop:
R. B. MOSER,
C. A. SELL.